Aug. 2, 1960 I. J. BARSY 2,947,596
DIELECTRIC HEATING MOLD AND METHOD OF
FORMING A WOODEN MOLD MEMBER
Filed Jan. 25, 1957
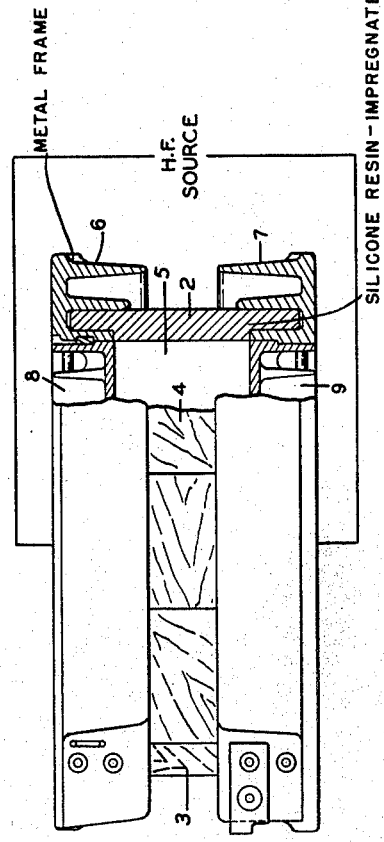
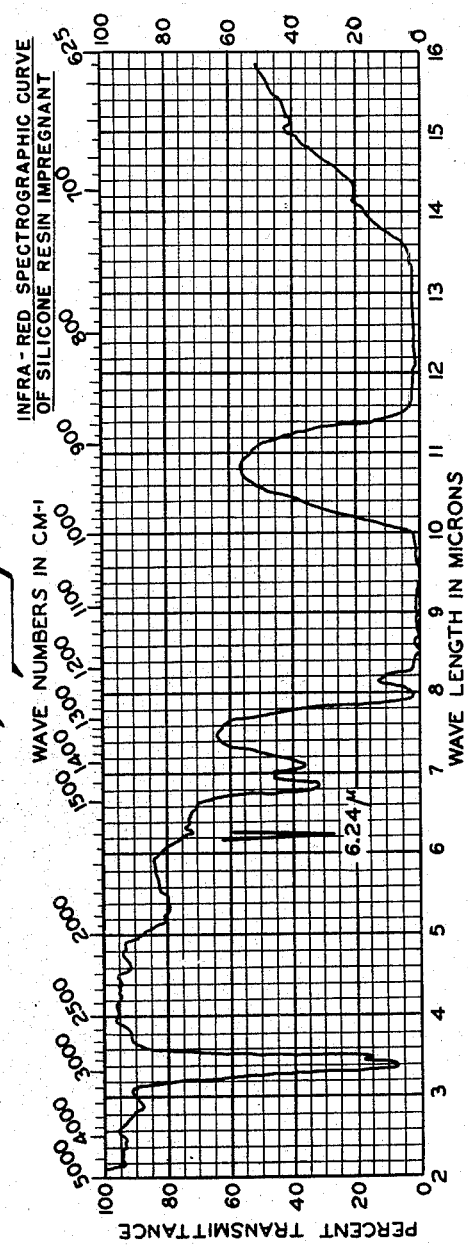
INVENTOR
IMRE J. BARSY
ATTORNEY 2,947,596
DIELECTRIC HEATING MOLD AND METHOD OF FORMING A WOODEN MOLD MEMBER

Imre J. Barsy, Lancaster Township, Lancaster County, Pa., assignor to Armstrong Cork Company, Lancaster, Pa., a corporation of Pennsylvania Filed Jan. 25, 1957, Ser. No. 636,289

12 Claims. (Cl. 18—47)

This invention relates to a dielectric heating mold. It also relates to a method of fabricating panels of wood for use in such a mold.

Scott Patent 2,526,698 describes a mold for confining a charge of dielectric material during processing by dielectric heating which mold is used in the manufacture of cork composition blocks, for instance. The side walls of the Scott mold are made of hard wood impregnated with ceresin wax.

Gard Patent 2,707,801 also discloses a similar mold structure in which the conventional wood mold as disclosed in the Scott patent is provided on its inner wall surfaces with liners which possess special characteristics permitting the mold to be used for dielectric heating where alternate runs of different materials, such as resin-bound cork tile and glue-bound industrial cork compositions, are molded.

As these prior patents have indicated, one of the problems involved in the molding of cork compositions and other products in molds with wooden walls has been to provide a molding surface from which the molded mass may be released after completion of each molding cycle.

An object of the present invention, therefore, is to provide a mold with walls of wood for confining a charge of dielectric material during processing by dielectric heating in which the charge of material and the wooden mold walls are both dielectrically heated simultaneously, which mold walls will have essentially permanent release characteristics, permitting ready extraction of the molded product from the mold upon completion of each molding cycle.

Another object of the invention is to provide a mold of the foregoing type in which the wall members of wood are essentially completely impregnated throughout with a resin cured in situ within the pores of the wood, minimizing the absorption of moisture within the mold walls even under unusually severe service conditions, while at the same time providing essentially permanent release characteristics.

An additional object of the invention is to provide a mold of the type mentioned in which the resin impregnant is so fixed within the body of the wood as to be essentially proof against bleeding or expulsion upon dielectric heating of the mold walls.

A further object of the invention is to provide a mold as described above which will withstand without noticeable deterioration of its essential electrical characteristics the repeated temperature extremes to which such molds are subjected in the course of dielectrically heating materials such as cork compositions.

Another object of the invention is to provide a method of fabricating wooden mold walls which will provide essentially complete direct replacement of all moisture within the wood by a body of resin which is then polymerized or otherwise cured directly within the cellular body of the wood without objectionable deterioration of the strength and other physical properties of the wood.

Other objects of the invention will be clear from the following description of an embodiment of the invention.

In the attached drawing:

Figure 1 is a diagrammatic view, partially in section, illustrating a typical mold structure embodying the invention; and Figure 2 is an infrared spectrophotometer curve for a silicone resin impregnating composition.

The mold structure

A typical mold structure is shown in Figure 1. This type of mold is disclosed in Lockwood Patent 2,625,710. It is typical of the type of mold to which the present invention is applicable. It includes end wall panels 2 and 3 and side wall panels 4 and 5 made of impregnated wood. Structural members of metal 6 and 7 are provided which receive the wooden wall members. End plates 8 and 9 form the top and bottom walls of the mold and constitute electrodes which are coupled to a high frequency source, as diagrammatically indicated in Figure 1.

The wooden mold wall panels

The wooden mold wall panels are formed of hard wood, preferably maple sapwood, from which essentially all moisture has been removed and has been replaced directly within the cellular body of the wood by a hard, glasslike silicone resin composition possessing certain specific physical characteristics which will be enumerated below and which serves when so combined within the body of the wood to provide not only essentially permanent release characteristics for the mold wall but also other desirable properties such as durable water repellency, with the internal void or cellular structure of the wood and the exposed surfaces being essentially sealed against water in liquid form. This insures against a continuous film of moisture along a path on the surface or through the cross section of the panel—an important characteristic where the mold wall is heated dielectrically along with the charge in the mold.

The preferred silicone resin is one which is air drying and cures or sets by polymerization and hydrolysis. It has a resin solids content of 90% and has a viscosity at 25° C. in the range of 10–100 centipoises (Saybolt Universal Viscometer). Its specific gravity at 25° C. is 1.05 to 1.15, and its color is light straw. It is soluble in xylene which is used as a solvent to reduce its viscosity within permissible limits for proper impregnation. The material when subjected to infrared analysis has a curve which is illustrated in the attached drawing as Figure 2.

The preferred silicone resin is a mixture of a partially hydrolyzed methyl substituted polysiloxane containing 20–50% by weight of alkoxy and the reaction product of a silica hydrosol and chlorinated methyl silane. The preparation of a resin of this sort is disclosed in Bass Patents 2,706,723 and 2,706,724 to which reference is made for further details of the resin and its preparation. Ordinary organo polysiloxanes and straight chain silicones such as Dow Corning Corporation's Silaneal or General Electric Company's Dri-Wall will not provide equivalent results. The mixture of the two components mentioned above, i.e. a mixture of a partially hydrolyzed methyl substituted polysiloxane containing 20–50% by weight of alkoxy and the reaction product of a silica hydrosol and a chlorinated methyl silane, when impregnated into a body of essentially dry hard wood and cured therein provides a unique combination of physical characteristics which makes the finished product ideally suited for dielectric heating mold walls, especially where cork compositions and the like are to be cured by dielectric heating while confined within the mold.

A mold wall of maple wood impregnated with the preferred resin composition and the resin cured therein was found to have the following dielectric values:

K _____ 2.56
Tan α _____ .052
Loss factor _____ .134

The values were determined at a frequency of 13.5 megacycles, at 70° F., with the wood grain perpendicular to the thickness of the blank under examination.

Other silicone resins having similar characteristics may be substituted, provided they meet the following specifications:

(1) At room temperature, 25° C., the resin impregnating composition should have a viscosity in the range of 10–100 centipoises with a resin solids content of 75% or more. The lower the viscosity of the resin composition, the better the penetration and the higher the percentage of absorption. This is an important consideration, since maple and other suitable hard woods for mold walls are rather dense, and for thick panels thorough impregnation is difficult to achieve even under ideal conditions.

(2) The resin composition must have a maximum time-temperature reaction factor which is the equivalent of 120 minutes at 320° F. A resin which will cure at a moderate temperature in the order of 230° F. to 240° F. is preferred. This maximum time-temperature reaction factor is essential to insure that the resin may be fully cured under temperature and time conditions which will not deleteriously affect the wood. As is well recognized, wood will withstand extremely high temperatures (320° F., for example) only for relatively short periods of time without deterioration. Wood is seriously deteriorated if subjected to relatively lower temperatures only if they are applied over extremely long periods of time. Thus, the time-temperature reaction factor plays an important part in achieving success, for the resin within the wooden mold walls must be cured without substantial sacrifice of the physical strength and other characteristics of the wood.

(3) The minimum silicone content of the resin composition should be 75%, the balance being the solvent carrier and what may be termed modifying agents. Optimum range of silicone solids resin content is 75–90%. The impregnating resin should contain no catalyst. The surface coating resin which will be discussed below may contain up to 2% to 3% of catalyst. Extensive experimentation has shown that even relatively minor amounts of other materials, such as phenol-formaldehyde condensation products which are sometimes compounded with silicone resins, substantially reduce or actually destroy the release properties of the finished mold panel. Minor amounts of some modifying agents can be tolerated, but if they are used it is preferred to keep them small. Conventional silicone oils and silicone waxes which have been recommended as release agents for coating mold surfaces have not been found to operate effectively as impregnants for wooden mold members for dielectric heating to obtain permanent release characteristics and the other physical properties which a wooden mold wall must possess. Permanent release characteristics have never been attained with such compositions, and with some of them the bond between the dielectrically heated molded material and the surface of the mold wall has been greater than the strength of the material itself, resulting in actual rupture of the product upon attempted extraction of it from the mold upon completion of the molding cycle.

(4) They should provide in the finished panel a loss factor in the range of .1 to .4.

*The fabrication of the mold wall panels*

The following description is directed to the formation of a typical mold wall panel for a mold such as shown in Figure 1 and useful in the molding of cork compositions, such as cork tile mats or cork composition blocks for gaskets, friction elements, or the like, employing dielectric heating to cure the binder used to join the cork particles together.

Rectangular pieces or blanks of hard maple sapwood (sugar maple-100% sapwood) are cut from seasoned, kiln-dried planks, and only flawless blanks acceptable for electrical uses are selected from the cut pieces. In the fabrication of a mold for dielectric heating of a mass of cork composition about 50" by 28" by 9", the rectangular blanks may be approximately 17⅛" by 9⁵⁄₁₆" by 2¾" thick.

These rectangular blanks of wood are heated dielectrically as disclosed in Gard Patent 2,631,109. The temperature is elevated to about 270° to 280° F., although temperatures in the range of 250° to 300° F. may be used. Preferred practice is to dielectrically heat the blanks on the same day that the wood is cut from the planks. The dielectric heating rate used should be moderate, involving 1½ to 2 hours, for example, for twenty blanks of the size mentioned above to attain a temperature of about 280° F. This initial dielectric heating serves to drive moisture from within the pores of the wood, and this result is achieved without serious strains being developed in the wood.

Upon completion of the dielectric heating, the blanks are placed in a forced convection oven at a temperature of about 195° F. for about 7 to 10 days. This serves to complete the removal of substantially all moisture from the wood and also to release all stresses in the wood so that any warpage can be cut away in the final fabrication of the mold wall from the rectangular blanks. It also serves to induce an antishrink efficiency in the pieces so that, upon subsequent heating during operation of the mold, openings between the panels constituting the mold walls will not occur or at least are greatly minimized, and objectionable checks and cracks in the blanks will be eliminated. At the end of the oven drying operation, the blanks are essentially bone dry.

The blanks are then cut to the final finished panel shape and size except that the thickness of the panels is made about ⅛" oversize to allow for final facing during or after installation of the panels into the metal mold supporting members, as shown in the drawing. It is preferred to so fabricate the blanks into panels to avoid waste of the impregnating resin and also to assure optimum impregnation. It is known that even with vacuum and pressure impregnation processes with hard, dense woods such as maple, there will be a greater concentration of the impregnant at the outer surfaces of the panels than in the center. Thus, it is desirable to have the panels, particularly the interior wall surfaces which will lie in engagement with the mass to be dielectrically heated, fabricated to approximately the desired final size before impregnation is effected; for this will insure that the interior mold surfaces will be fully impregnated. With the process of the present invention, impregnation will be effected throughout the whole thickness of the board; although, as mentioned above, there will be a greater concentration of the impregnating composition adjacent to the outer surfaces of the pieces.

The shaped panels are inspected to eliminate those with electrically or mechanically objectionable flaws, and the selected panels are heated a second time by the dielectric effect. This time they are elevated to a temperature above 230° F., preferably in the order of 290° to 300° F. It is preferred to maintain the temperature below about 320° F. to avoid damage to the wood. A moderate heating rate is employed. For example, a batch of twenty panels may be raised to a temperature of about 300° F. in approximately one hour. There is a slight moisture pickup during the fabrication operations, and this is removed by the second dielectric heating. The wood is also elevated substantially in temperature, and impregnation which follows is enhanced by reason of the partial vacuum created within the body of the wood as its temperature falls.

The heated panels are immersed while hot, immediately upon completion of the heating cycle, in a thermally insulated tank of resin composition. The resin may be at room temperature. The panels are kept immersed in the resin for a period of 72 hours and are then removed and permitted to drain.

While the resin is at room temperature at the start of the impregnation cycle, after the 20 panels have been immersed in the tank, the temperature of the fluid will have been raised by the heated panels to about 140° to 160° F. The thermally insulated tank and the mass of wood involved assures gradual cooling, and room temperature is reached in 60 to 72 hours. This gradual cooling of the wood and resin during the immersion phase of the process is also a factor in attaining the desired degree of impregnation.

The impregnated panels are suspended from a rack with good ventilation and are air-dried for a minimum of 20 days. A longer air drying period is not at all harmful. This air drying step is important in getting rid of solvent at the surface, at least, of the panels and also for starting polymerization or curing of the resin. This minimizes bleeding of the resin when final curing at elevated temperatures is effected. The air drying may be at room temperature as noted, in the order of 70° to 90° F.

The panels are then suspended in a well ventilated oven and subjected to the following time-temperature curing schedule:

|  | ° F. |
|---|---|
| 2 to 2½ days | 125 |
| 2 days | 150 |
| 5 days | 175 |
| 1 day | 200 |
| 3 days | 230 |

This procedure is followed to minimize bleeding of the resin from the wood before it cures or sets therein.

The panels are cooled to about room temperature gradually, before removal from the oven. A cooling period of 4 to 6 hours is adequate.

With maple sapwood, which is relatively hard and dense, it has been possible, following the foregoing method, to incorporate as much as 50% of the weight of the wood of resin composition. Maple panels having 25% of the resin by weight impregnated therein have been found to be satisfactory.

By gradually increasing the temperature over a period of ten days in the curing cycle before attaining the final curing temperature of 230° F., bleeding of the resin is reduced to a bare minimum and an excellent cure is attained. Loss of a few percent of the total weight of the resin absorbed by the panels and carried on the surface of the panels may occur through exudation and loss of solvent in the process, but this is insignificant.

It is preferred, of course, to cool the blanks to room temperature gradually so as to avoid severe shocks on the wood. Also, rapid cooling might result in undesirable cracking or checking of the surface which would be objectionable. It is desirable during resin curing to heat the panels to a temperature in the order of the temperature to be employed in production molding using the wooden mold, generally in the range between 200° F. and 240° F. Where cork compositions are to be produced at a mold wall temperature of about 230° F. as a maximum, it is desirable to cure the resin in the panels at that temperature since by so doing it will be safe to go to that temperature in actual molding of products, without any fear of loss of impregnant or exudation of the impregnant to the surface of the mold wall where its presence might be objectionable. The resin is bonded firmly to the wood but provides a permanent release surface for compositions to be molded.

After the panels are installed in the metal mold members and properly face finished, the exposed surfaces of the panels are preferably coated either by brushing or spraying with a resin similar to the resin impregnated into the panels. Preferably the same resin composition is employed except that a catalyst is added to insure proper cure of the resin at room temperatures and to accelerate air drying. Curing may be accomplished at room temperature in about twelves hours, but a longer period will do no harm. The mold is then placed in a dry, clean oven; and the temperature is raised gradually, over 1 to 2 hours, to about 220° F. The coated surfaces are maintained at a temperature of 220° to 230° F. for about 8 hours. A longer period at this temperature is not necessary, but it is not harmful. The mold is now ready for service.

I claim:

1. In a mold for confining a charge of dielectric material during processing by dielectric heating in which the charge of material and the mold are both dielectrically heated simultaneously, the combination of a mold side wall formed of hard wood from which essentially all moisture has been removed and has been replaced directly within the cellular body thereof by a body of resin which consists essentially of the hard, glasslike heat reaction product of a potentially reactive silicone resin-forming composition comprising a mixture of a partially hydrolyzed methyl substituted polysiloxane containing 20–50% by weight of alkoxy and the reaction product of a silica hydrosol and chlorinated methyl silane, having a minimum resin solids content of 75%, a maximum time-temperature reaction factor the equivalent of 120 minutes at 320° F., and an infrared spectrophotometer curve substantially as shown in Figure 2 cured directly within the cellular body at a minimum final curing temperature of about 200° F.

2. In a mold for confining a charge of dielectric material during processing by dielectric heating in which the charge of material and the mold are both dielectrically heated simultaneously, the combination of a mold side wall formed of hard wood from which essentially all moisture has been removed and has been replaced directly within the cellular body thereof by a body of resin which consists essentially of the hard, glasslike heat reaction product of a potentially reactive silicone resin-forming composition comprising a mixture of a partially hydrolyzed methyl substituted polysiloxane containing 20–50% by weight of alkoxy and the reaction product of a silica hydrosol and chlorinated methyl silane, having a minimum resin solids content of 75%, and a maximum time-temperature reaction factor the equivalent of 120 minutes at 320° F. cured directly within the cellular body at a minimum final curing temperature of about 200° F.

3. A mold in accordance with claim 2 in which the wood is maple sapwood and in which the cured impregnant constitutes a minimum of about 25% of the weight of the wood.

4. A mold in accordance with claim 2 in which there is a coating on the wall surface of essentially the same resinous composition as the impregnant.

5. A mold in accordance with claim 2 in which the wood is maple sapwood, in which the resin composition has a minimum solids content of about 90%, a viscosity of 10–100 centipoises and is cured at a maximum temperature of about 240° F., and in which the cured impregnane constitutes a minimum of about 25% of the weight of the wood.

6. In a method of forming a wooden mold member for a mold for confining a charge of dielectric material during processing in which the charge of material and the mold are both dielectrically heated simultaneously, the steps comprising forming a panel of hard wood essentially free of moisture, impregnating said panel throughout the entire body thereof with an air drying potentially reactive silicone resin-forming composition having a minimum resin solids content of 75% and comprising a mixture of a partially hydrolyzed methyl substituted polysiloxane containing 20–50% by weight of alkoxy and the reaction product of a silica hydrosol and chlorinated methyl silane, said resin having a maximum time-temperature reaction factor the equivalent of 120 minutes at 320° F., air drying said impregnated panel to set the resin against excessive bleeding from within the cellular body of said panel, and thereafter heating said impregnated panel at a minimum final cure temperature of about 200° F. to cure said resin to a hard, glasslike condition directly within the cellular body of said panel.

7. In a method of forming a wooden mold member for a mold for confining a charge of dielectric material during processing in which the charge of material and the mold are both dielectrically heated simultaneously, the steps comprising forming a panel of hard wood essentially free of moisture, impregnating said panel throughout the entire body thereof with a minimum of about 25% of the weight of the wood of an air drying potentially reactive silicone resin-forming composition having a minimum resin solids content of 75% and comprising a mixture of a partially hydrolyzed methyl substituted polysiloxane containing 20–50% by weight of alkoxy and the reaction product of a silica hydrosol and chlorinated methyl silane, said resin having a maximum time-temperature reaction factor the equivalent of 120 minutes at 320° F., air drying said impregnated panel to set the resin against excessive bleeding from within the cellular body of said panel, and thereafter heating said impregnated panel at a cure temperature of 200° F. to 240° F. to cure said resin to a hard, glasslike condition directly within the cellular body of said panel.

8. In a method of forming a wooden mold member for a mold for confining a charge of dielectric material during processing in which the charge of material and the mold are both dielectrically heated simultaneously, the steps comprising forming a panel of hard wood essentially free of moisture, impregnating said panel throughout the entire body thereof with an air drying potentially reactive silicone resin-forming composition having a minimum resin solids content of 75% and comprising a mixture of a partially hydrolyzed methyl substituted polysiloxane containing 20–50% by weight of alkoxy and the reaction product of a silica hydrosol and chlorinated methyl silane, said resin having a maximum time-temperature reaction factor the equivalent of 120 minutes at 320° F., air drying said impregnated panel to set the resin against excessive bleeding from within the cellular body of said panel, and thereafter heating said impregnated panel at a cure temperature above about 200° F. and below about 240° F. to cure said resin to a hard, glasslike condition directly within the cellular body of said panel.

9. In a method of forming a wooden mold member for a mold for confining a charge of dielectric material during processing in which the charge of material and the mold are both dielectrically heated simultaneously, the steps comprising forming a panel of hard wood essentially free of moisture, heating said panel dielectrically to a temperature above 230° F., immersing said heated panel in a bath of an air drying potentially reactive silicone resin-forming composition having a minimum resin solids content of 75% and comprising a mixture of a partially hydrolyzed methyl substituted polysiloxane containing 20–50% by weight of alkoxy and the reaction product of a silica hydrosol and chlorinated methyl silane, said resin having a maximum time-temperature reaction factor the equivalent of 120 minutes at 320° F., permitting said panel to remain in said silicone resin composition until the wood is impregnated throughout with said resin composition, air drying said impregnated panel, and thereafter heating said impregnated panel at a minimum final cure temperature of about 200° F. to cure said resin to a hard, glasslike condition directly within the cellular body of said panel.

10. In a method of forming a wooden mold member for a mold for confining a charge of dielectric material during processing in which the charge of material and the mold are both dielectrically heated simultaneously, the steps comprising forming a panel of hard wood essentially free of moisture, impregnating said panel throughout the entire body thereof with an air drying potentially reactive silicone resin-forming composition comprising a mixture of a partially hydrolyzed methyl substituted polysiloxane containing 20–50% by weight of alkoxy and the reaction product of a silica hydrosol and chlorinated methyl silane, having an infrared spectrophotometer curve substantially as shown in Figure 2, said resin having a maximum time-temperature reaction factor the equivalent of 120 minutes at 320° F., air drying said impregnated panel to set the resin against excessive bleeding from within the cellular body of said panel, and thereafter heating said impregnated panel at a minimum final cure temperature of about 200° F. to cure said resin to a hard, glasslike condition directly within the cellular body of said panel.

11. In a method of forming a wooden mold member for a mold for confining a charge of dielectric material during processing in which the charge of material and the mold are both dielectrically heated simultaneously, the steps comprising forming a panel of maple sapwood, removing moisture from said panel until the same is essentially bone dry, impregnating said panel with an air drying potentially reactive silicone resin-forming composition, said resin composition having a minimum resin solids content of 75% and a maximum time-temperature reaction factor the equivalent of 120 minutes at 320° F., and comprising a mixture of a partially hydrolyzed methyl substituted polysiloxane containing 20–50% by weight of alkoxy and the reaction product of a silica hydrosol and chlorinated methyl silane, air drying said impregnated panel at a temperature of 70° to 90° F. for a minimum of twenty days, oven curing said panel at a temperature of 125° to 200° F. for a minimum of ten days, finally curing said panel at a temperature of 230° F. for three days, and thereafter cooling said panel to room temperature whereby said resin is cured to a hard, glasslike condition directly within the cellular body of said panel and is rendered proof against exudation therefrom under normal dielectric heating conditions at temperatures up to 230° F.

12. In a method of forming a wooden mold member for a mold for confining a charge of dielectric material during processing in which the charge of material and the mold are both dielectrically heated simultaneously, the steps comprising forming a panel of hard wood, freeing said panel of all moisture, to provide a panel in substantially bone dry condition, impregnating said panel throughout the entire body thereof with a potentially reactive silicone resin-forming composition having a minimum resin solids content of 75% and a maximum time-temperature reaction factor the equivalent of 120 minutes at 320° F., and comprising a mixture of a partially hydrolyzed methyl substituted polysiloxane containing 20–50% by weight of alkoxy and the reaction product of a silica hydrosol and chlorinated methyl silane, which can be cured at a temperature below 240° F., air drying said panel for a substantial period of time to set said resin within the body of said panel, and thereafter finally curing said resin at a temperature at least equal to the temperature to be employed in dielectric heating, using said mold, said temperature falling in the range between 200° and 240° F.

References Cited in the file of this patent

UNITED STATES PATENTS

| | | |
|---|---|---|
| 2,114,784 | Maisch | Apr. 19, 1938 |
| 2,363,658 | Decker | Nov. 28, 1944 |
| 2,526,698 | Scott | Oct. 24, 1950 |
| 2,605,194 | Smith | July 29, 1952 |
| 2,631,109 | Gard | Mar. 10, 1953 |
| 2,706,723 | Bass | Apr. 19, 1955 |
| 2,706,724 | Bass | Apr. 19, 1955 |
| 2,754,546 | Mason et al. | July 17, 1956 |

FOREIGN PATENTS

| | | |
|---|---|---|
| 726,224 | Great Britain | Mar. 16, 1955 |

OTHER REFERENCES

Rochow: "The Chemistry of the Silicones," 1946, pp. 70 and 71.